United States Patent
Cook et al.

(10) Patent No.: US 8,746,100 B2
(45) Date of Patent: Jun. 10, 2014

(54) STAKED NUT AND FLANGE FOR GEAR SUPPORT

(75) Inventors: Dennis Cook, Royal Oak, MI (US); Jonathan M. Adler, Ann Arbor, MI (US)

(73) Assignee: McLaren Performance Technologies Inc., Southfield, MI (US)

( * ) Notice: Subject to any disclaimer, the term of this patent is extended or adjusted under 35 U.S.C. 154(b) by 0 days.

(21) Appl. No.: 13/497,957

(22) PCT Filed: Sep. 27, 2010

(86) PCT No.: PCT/US2010/002620
§ 371 (c)(1),
(2), (4) Date: Apr. 12, 2012

(87) PCT Pub. No.: WO2011/037640
PCT Pub. Date: Mar. 31, 2011

(65) Prior Publication Data
US 2012/0186390 A1    Jul. 26, 2012

Related U.S. Application Data

(60) Provisional application No. 61/277,539, filed on Sep. 25, 2009.

(51) Int. Cl.
*F16H 1/14* (2006.01)

(52) U.S. Cl.
USPC ........... 74/417; 411/329; 411/204; 29/525.05

(58) Field of Classification Search
USPC ......... 74/640, 469.5; 411/326–329, 402, 403, 411/427, 203–207
See application file for complete search history.

(56) References Cited

U.S. PATENT DOCUMENTS

| | | | | | |
|---|---|---|---|---|---|
| 644,159 | A | * | 2/1900 | Rosan | 411/237 |
| 1,893,572 | A | * | 1/1933 | Wildhaber | 74/460 |
| 2,577,810 | A | * | 12/1951 | Rosan | 411/109 |
| 2,741,289 | A | * | 4/1956 | Grow | 411/185 |
| 3,405,752 | A | * | 10/1968 | Neuschotz | 411/180 |
| 3,431,960 | A | | 3/1969 | Neuschotz | |
| 4,905,546 | A | * | 3/1990 | Katscher et al. | 81/54 |
| 4,971,497 | A | * | 11/1990 | Stoffer et al. | 411/108 |
| 5,020,953 | A | * | 6/1991 | Wada | 411/247 |

(Continued)

FOREIGN PATENT DOCUMENTS

| | | |
|---|---|---|
| DE | 8620893 | 11/1986 |
| EP | 0268817 | 6/1988 |
| EP | 1892428 | 2/2008 |

*Primary Examiner* — Troy Chambers
*Assistant Examiner* — Valentin Craciun
(74) *Attorney, Agent, or Firm* — Miller Canfield

(57) ABSTRACT

A gearbox assembly includes a pinion gear having a gear stem extending axially through a tubular output stem of an output member with a threaded portion protruding from an output flange of the output member. A pinion nut includes a threaded inner bore threadably engaging the threaded portion of the gear stem to retain the output member to the pinion gear. An outer rim of the pinion nut defines an outer circumference having a tool recess and a deformation spaced circumferentially apart from the tool recess. The tool recess is adapted for receiving a tool to rotate the pinion nut in a first direction relative to the gear stem. The deformation engages an inner circumference of the output flange to prevent the pinion nut from rotating in a second direction relative to the gear stem.

11 Claims, 4 Drawing Sheets

(56) References Cited

U.S. PATENT DOCUMENTS

| | | | |
|---|---|---|---|
| 5,195,854 A * | 3/1993 | Nagayama | 411/427 |
| 5,238,342 A * | 8/1993 | Stencel | 411/43 |
| 5,259,271 A | 11/1993 | Martin et al. | |
| 5,702,214 A | 12/1997 | Duran | |
| 5,918,505 A * | 7/1999 | Jensen | 74/89.26 |
| 5,934,851 A | 8/1999 | Stewart et al. | |
| 6,092,968 A * | 7/2000 | Lanham et al. | 411/431 |
| 6,164,886 A * | 12/2000 | Matarazzo et al. | 411/176 |
| 6,293,704 B1 * | 9/2001 | Gradu | 384/557 |
| 6,595,734 B2 | 7/2003 | Duran et al. | |
| 7,000,995 B2 * | 2/2006 | Hagelthorn | 301/105.1 |
| 7,431,560 B2 | 10/2008 | Sterner | |
| 2002/0134605 A1 * | 9/2002 | Bowen et al. | 180/233 |
| 2009/0311072 A1 * | 12/2009 | Kruse et al. | 411/190 |
| 2010/0143031 A1 | 6/2010 | Chamberlin et al. | |

* cited by examiner

STAKED NUT AND FLANGE FOR GEAR SUPPORT

CROSS-REFERENCE TO RELATED APPLICATION

This application claims priority to and all the benefits of U.S. Provisional Application No. 61/277,539, filed on Sep. 25, 2009 and entitled "Staked Nut And Flange For Gear Support."

BACKGROUND OF THE INVENTION

1. Field of the Invention

The present invention relates to a gearbox for an automotive vehicle.

2. Description of Related Art

Typically, gearboxes are used to increase torque while reducing the speed of a prime mover output shaft. This means that the output shaft of a gearbox will rotate at a slower rate than an input shaft. This reduction in speed will produce a mechanical advantage, causing an increase in torque. Alternatively, gearboxes can be setup to do the opposite and provide an increase in output shaft speed with a reduction of torque. Some of the simplest gearboxes merely change the physical direction in which power is transmitted.

Gearboxes generally include a housing containing a pinion gear that is driven by an input shaft. The pinion gear, in turn, drives an output member having an output flange. The output flange is disposed outside of the housing and is adapted to be coupled with a vehicle driveline component. The pinion gear includes a gear portion operatively engaged with the input shaft and an axially extending gear stem that is externally splined along its length. The output member includes an axially extending output stem that is internally splined along its length. The gear stem extends through the output stem and is in splined engagement therewith such that rotation of the pinion gear by the input shaft causes the output member to rotate. The pinion gear and output member are supported by a pair of axially spaced apart bearings disposed radially between the output stem and the housing. A distal end of the gear stem includes a threaded portion for receiving a pinion nut to secure the output member to the pinion gear.

Over time, due to vibration or the like, it is possible that the pinion nut will back-off or loosen which allows for axial play between the output member and the pinion gear. There are a variety of known ways to secure the pinion nut to the gear stem to prevent the pinion nut from loosening over time. For example, the pinion nut may be staked to the gear stem, however, most stakeable nuts have separate features for tightening the nut and staking the nut such that more space is required for these types of nuts. A castle nut requires a separate piece, such as a cotter pin, which is deformed between the gear stem and slots or other hard features on the castle nut. A prevailing torque nut includes a plastic insert or noncircular head to increase the friction between the nut and the gear stem. A crush sleeve is elastically deformed and provides a preload against the nut that inhibits loosening of the nut. Prevailing torque nuts and crush sleeves, however, can only be used once. An adhesive, such as Loctite®, can also be used but the adhesion between the nut and gear stem may be broken under conditions of vibration in high stiffness systems. Finally, there are different thread forms that inhibit loosening of the nut through added friction between the nut and the gear stem.

Each of these previously mentioned types of nuts and nut retention methods have inherent drawbacks. It is therefore desirable to provide a simple and compact nut that can be secured to a threaded shaft to secure two members together and will not loosen over time due to vibration or the like. It is also desirable that the nut be removable from the threaded shaft and can be reused.

SUMMARY OF THE INVENTION

According to one embodiment of the invention, a gearbox assembly includes a pinion gear, an output member, and a pinion nut. The pinion gear includes a gear stem defining an axis. The gear stem includes a threaded portion. The output member includes an output flange and a tubular output stem. The output flange includes an inner circumference that is coaxial with the tubular output stem. The gear stem extends axially through the tubular output stem and the inner circumference such that the threaded portion protrudes from the output flange. The pinion nut includes a threaded inner bore and an outer rim. The threaded inner bore threadably engages the threaded portion of the gear stem thereby retaining the output member to the pinion gear. The outer rim defines an outer circumference that includes a tool recess and a deformation spaced circumferentially apart from the tool recess. The tool recess is adapted for receiving a tool to rotate the pinion nut in a first direction relative to the gear stem. The deformation engages the inner circumference of the output flange thereby preventing the pinion nut from rotating in a second direction relative to the gear stem.

According to another embodiment of the invention, a fastener assembly includes a first member, a second member, and a nut. The first member includes a threaded circumference. The second member includes a circumference having a plurality of serrations disposed therearound. The nut includes inner and outer circumferences. One of the inner and outer circumferences threadably engages the threaded circumference of the first member thereby retaining the second member to the first member. The other of the inner and outer circumferences includes a tool recess and a deformation spaced circumferentially apart from the tool recess. The tool recess is adapted for receiving a tool to rotate the nut in a first direction relative to the first member, and the deformation extends into one of the plurality of serrations of the second member thereby preventing the nut from rotating in a second direction relative to the first member.

According to yet another embodiment of the invention, a method of retaining an output member to a pinion gear with a pinion nut includes the steps of rotating the pinion nut along a threaded portion of the pinion gear using a tool recess formed in an outer circumference of the pinion nut, and deforming the outer circumference of the pinion nut at a location spaced circumferentially apart from the tool recess to engage the outer circumference of the pinion nut with the output member after the step of rotating the pinion nut.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
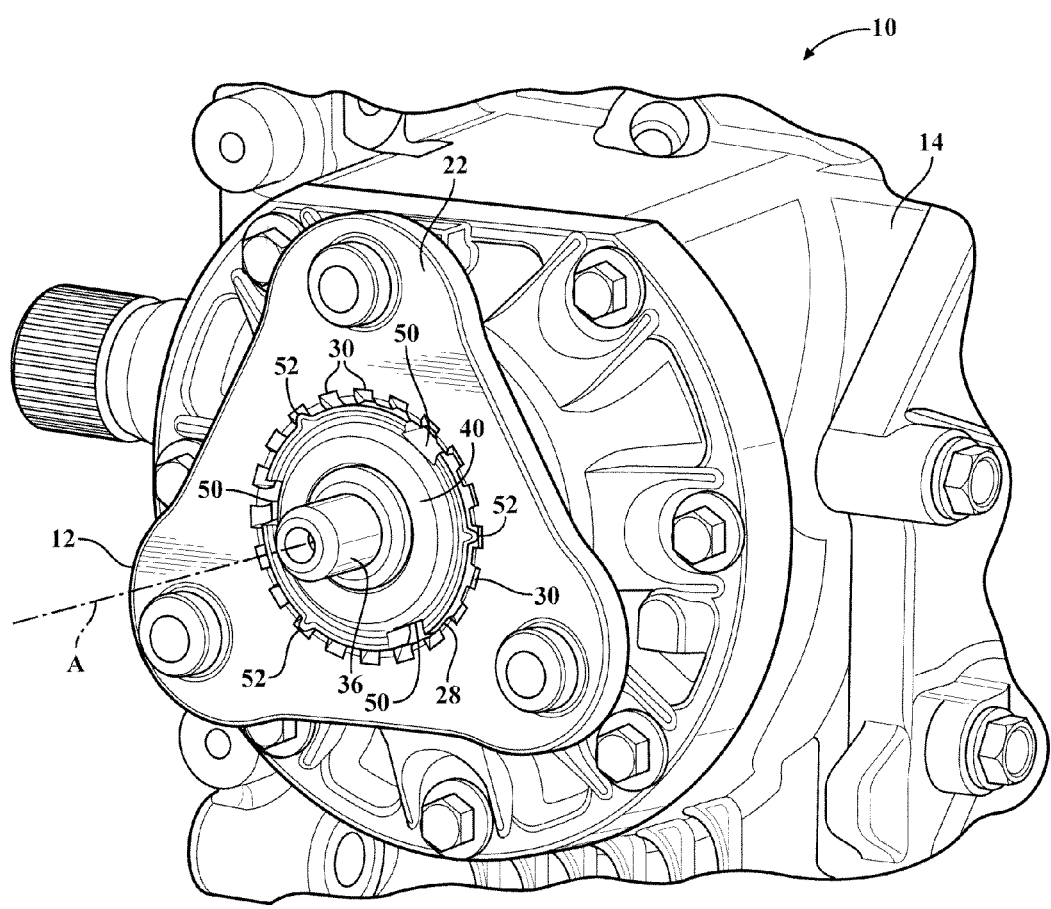
FIG. 1 is a fragmentary, perspective view of a gearbox assembly illustrating a pinion nut retaining an output member to a pinion gear according to one embodiment of the invention.
Figure 2:
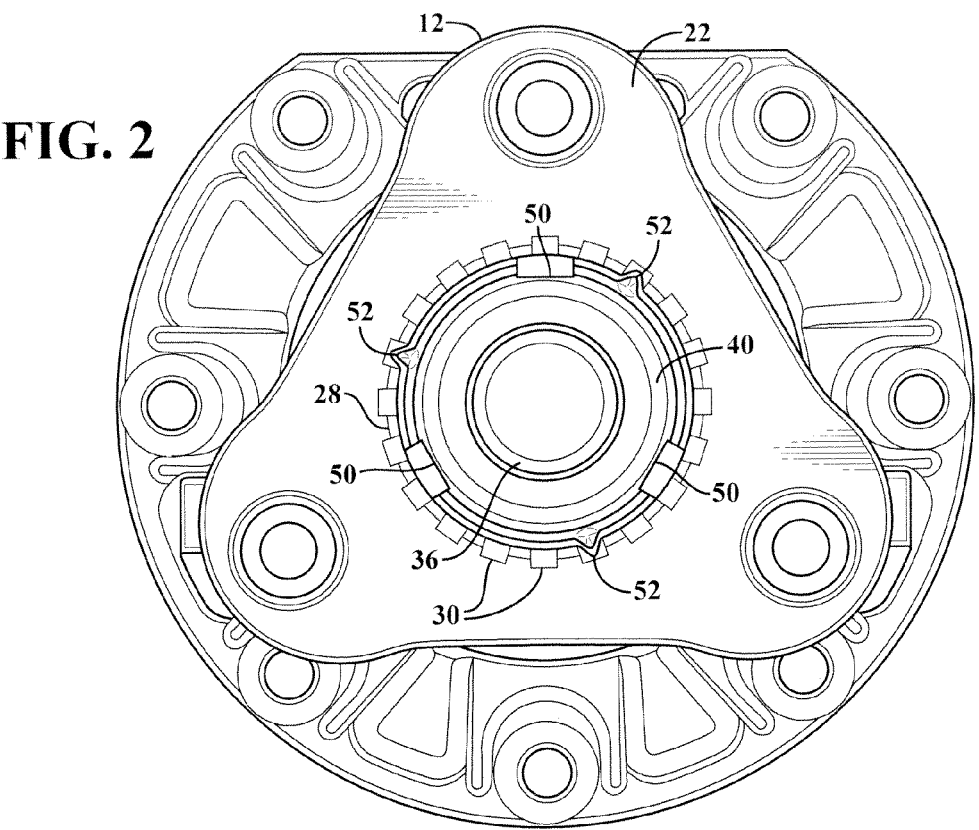
FIG. 2 is a front view of the gearbox assembly shown in FIG. 1.
Figure 3:
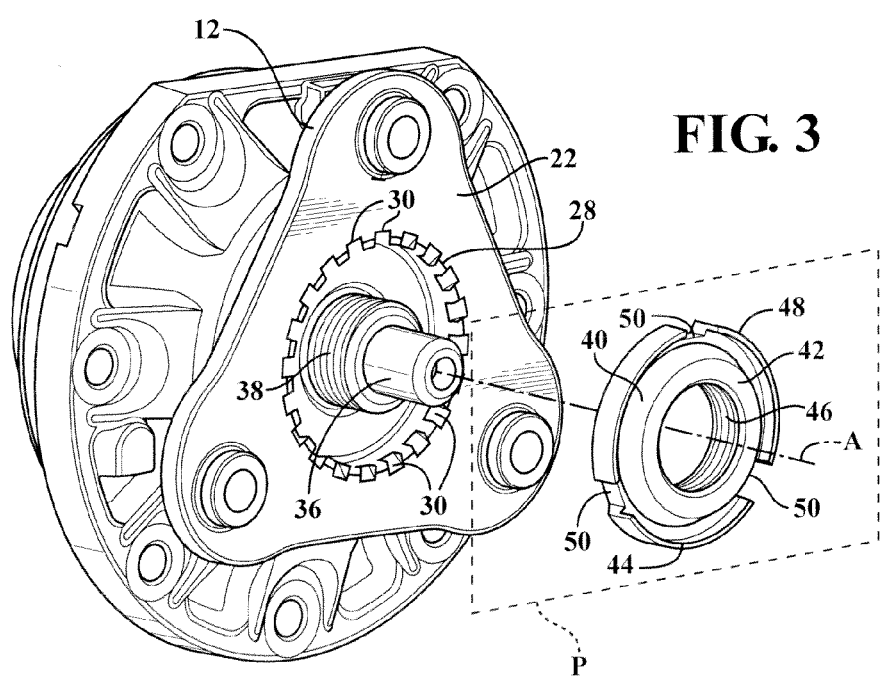
FIG. 3 is a partially exploded, perspective view of the gearbox assembly shown in FIG. 1.

Referring to FIGS. 1 through 3 and 6, a gearbox is generally shown at 10 for transmitting power in the form of rotational movement from a driving member or input shaft (not shown) to an output member 12. The gearbox 10 includes a housing 14 (partially shown) defining an internal cavity for containing the input shaft and a pinion gear 16. The pinion gear 16 extends perpendicularly to the input shaft and includes a gear portion 18 and a gear stem 20. The gear stem 20 defines an axis A. A ring gear (not shown) is coupled to the input shaft for rotation therewith. The ring gear is oriented for meshing engagement with the gear portion 18 of the pinion gear 16 to transmit rotation of the input shaft into rotation of the pinion gear 16 about the axis A.

The output member 12 includes an output flange 22 and a tubular output stem 24. The output flange 22 is disposed outside of the housing 14 and is adapted to be coupled with a vehicle driveline component. The output stem 24 is internally splined along its length and is coaxial with the axis A. The gear stem 20 is externally splined along its length and extends axially through the output stem 24. The gear stem 20 is in splined engagement with the output stem 24 to transmit rotation of the pinion gear 16 into rotation of the output member 12 about the axis A. The output flange 22 includes a recessed portion 26 that is coaxial with the output stem 24 and the axis A. The recessed portion 26 defines an inner circumference 28 having a plurality of serrations 30 disposed therearound.

First and second bearings 32, 34 are axially spaced apart and are disposed radially between the output stem 24 and the housing 14. Thus, the output member 12 and the pinion gear 16 are rotatably supported by the first and second bearings 32, 34.

A distal end 36 of the gear stem 20 that is disposed away from the gear portion 18 of the pinion gear 16 extends through the recessed portion 26 of the output flange 22 and protrudes outwardly from the output flange 22. The distal end 36 of the gear stem 20 includes a threaded portion 38 for receiving a pinion nut 40 to secure the output member 12 to the pinion gear 16. The pinion nut 40 includes a hub 42 and an outer rim 44. The hub 42 is hardened steel and includes a threaded inner bore 46. The threaded inner bore 46 threadably engages the threaded portion 38 of the gear stem 20. The outer rim 44 is ductile steel and defines an outer circumference 48. It is understood that the hardness variation between the hub 42 and the outer rim 44 can be achieved by non-uniform heat treatment of the pinion nut 40. The outer circumference 48 establishes a plane P that is oriented perpendicularly to the axis A. The outer circumference 48 includes at least one drive feature or tool recess 50 that is adapted for receiving a tool (not shown) which is used to rotate the pinion nut 40 along the threaded portion 38 of the gear stem 20 in a first or clockwise direction. In the embodiment shown, the outer circumference 48 includes three circumferentially spaced tool recesses 50. The tool recesses 50 are disposed in the plane P established by the outer circumference 48 of the pinion nut 40. A tool engages the tool recesses 50 to rotate the pinion nut 40 along the threaded portion 38 of the gear stem 20 and tighten the pinion nut 40 against the recessed portion 26 of the output flange 22 to secure the output member 12 to the pinion gear 16.

A staking operation is used to deform the outer circumference 48 of the pinion nut 40 at a location spaced circumferentially apart from the tool recesses 50. More specifically, the staking operation deforms the outer circumference 48 of the pinion nut 40 into the serrations 30 in the inner circumference 28 of the recessed portion 26 of the output flange 22. The staking operation creates at least one deformation 52 that extends outwardly into one of the serrations 30 which prevents the pinion nut 40 from rotating along the threaded portion 38 of the gear stem 20 in a second or counterclockwise direction. As such, the engagement of the deformation 52 with the serration 30 prevents the pinion nut 40 from loosening over time due to vibration. In the embodiment shown, the outer circumference 48 of the pinion nut 40 includes three deformations 52 that are circumferentially spaced apart such that each deformation 52 extends into a different serration 30. The number of deformations 52 can be selected depending on the desired amount of retention for the pinion nut 40 on the gear stem 20. The deformations 52 are disposed in the plane P established by the outer circumference 48 of the pinion nut 40 such that the deformations 52 are coplanar with the tool recesses 50. The deformations 52 are spaced circumferentially apart from the tool recesses 50 such that the outer circumference 48 of the pinion nut 40 that is directly adjacent the tool recesses 50 is not deformed. Thus, the tool recesses 50 remain wholly intact. Therefore, if desired, the deformations 52 can be removed such that they do not extend into the serrations 30 and the tool is used to engage the tool recesses 50 to rotate the pinion nut 40 along the threaded portion 38 of the gear stem 20.

Figure 4:
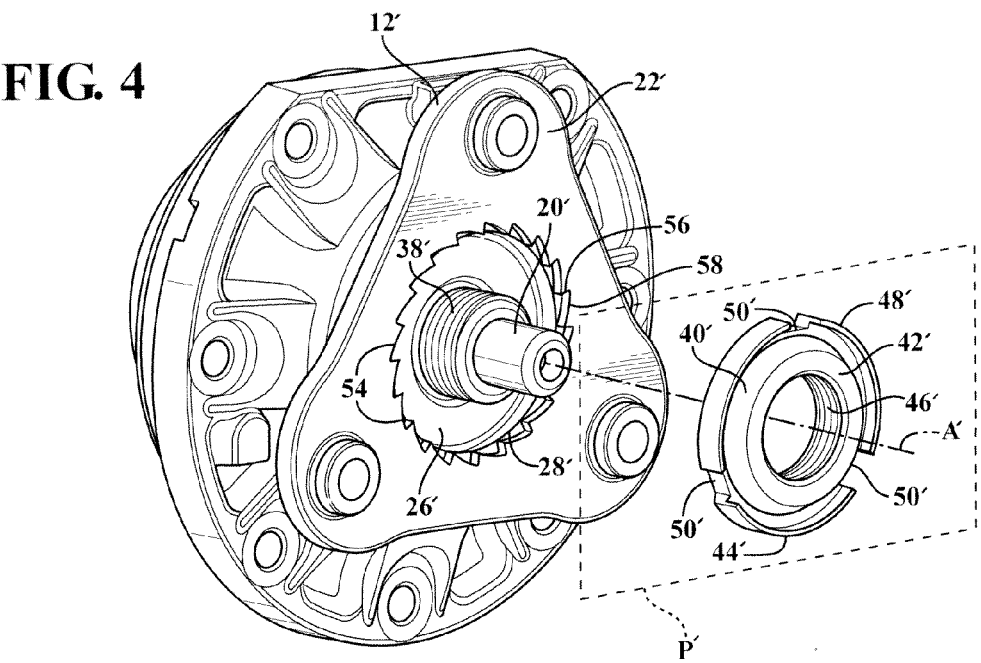
FIG. 4 is a partially exploded, perspective view of a gearbox assembly according to another embodiment of the invention.
Figure 5:
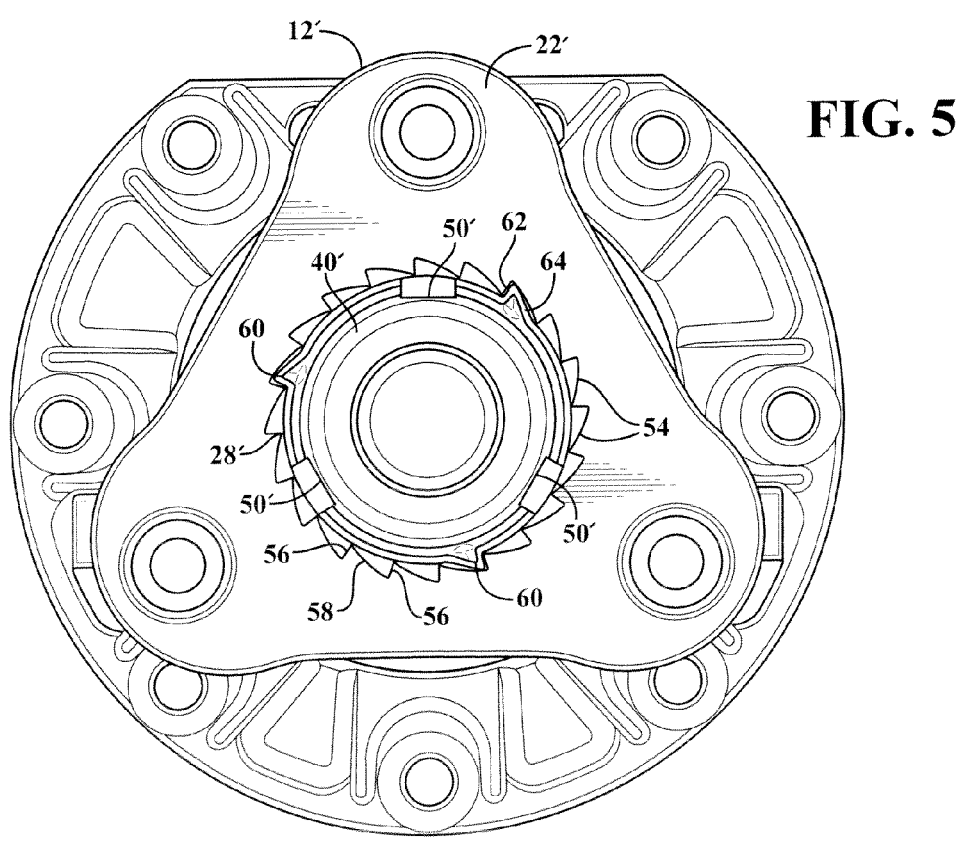
FIG. 5 is a front view of the gearbox assembly shown in FIG. 4.
Figure 6:
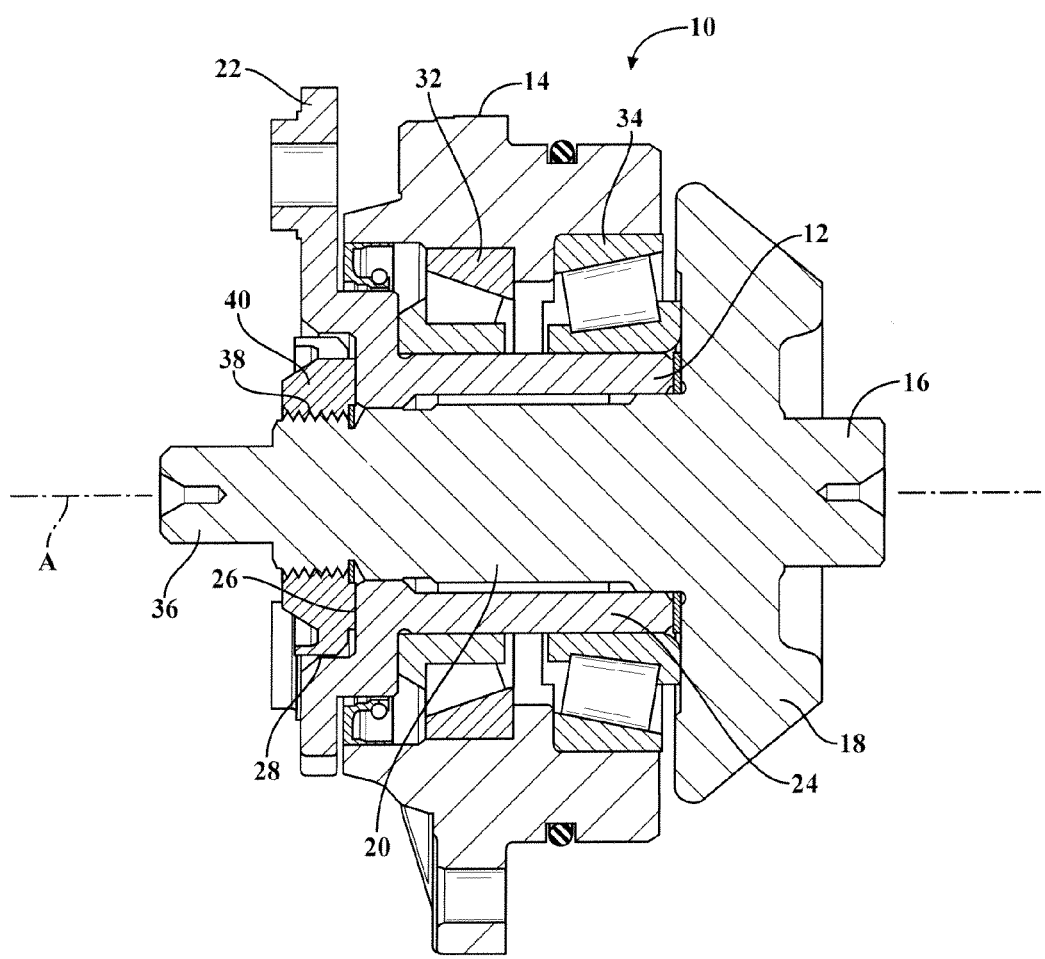
FIG. 6 is a fragmentary, cross-sectional view of the gearbox assembly.

Referring to FIGS. 4 and 5, wherein like primed reference numerals represent similar elements as those described above, in a second embodiment of the invention an output member 12' includes an output flange 22' having a recessed portion 26' defining an inner circumference 28' with a plurality of directional serrations 54 disposed therearound. Each directional serration 54 includes a flat side 56 extending radially outward and a curved side 58 extending between the flat sides 56 of adjacent directional serrations 54. More specifically, each curved side 58 extends in a clockwise direction from an outer end of the flat side 56 of one directional serration 54 to an inner end of the flat side 56 of the adjacent directional serration 54.

As described above with respect to the first embodiment, a pinion nut 40' includes a hub 42' and an outer rim 44'. The hub 42' is hardened steel and includes a threaded inner bore 46'. The threaded inner bore 46' threadably engages a threaded portion 38' of the gear stem 20'. The outer rim 44' is ductile steel and defines an outer circumference 48'. It is understood that the hardness variation between the hub 42' and the outer rim 44' can be achieved by non-uniform heat treatment of the pinion nut 40'. The outer circumference 48' establishes a plane P' that is oriented perpendicularly to an axis A' defined by the gear stem 20'. The outer circumference 48' includes at least one drive feature or tool recess 50' that is adapted for receiving a tool (not shown) which is used to rotate the pinion nut 40' along the threaded portion 38' of the gear stem 20' in a first or clockwise direction. In the embodiment shown, the outer circumference 48' includes three circumferentially spaced tool recesses 50'. The tool recesses 50' are disposed in the plane P' established by the outer circumference 48' of the pinion nut 40'. A tool engages the tool recesses 50' to rotate the pinion nut 40' along the threaded portion 38' of the gear stem 20' and tighten the pinion nut 40' against the recessed portion 26' of the output flange 22' to secure the output member 12' to the pinion gear 16'.

A staking operation is used to deform the outer circumference 48' of the pinion nut 40' at a location spaced circumferentially away from the tool recesses 50'. More specifically, the staking operation deforms the outer circumference 48' of the pinion nut 40' into the directional serrations 54 of the output member 12'. The staking operation creates at least one deformation 60 that extends outwardly into one of the directional serrations 54 which prevents the pinion nut 40' from loosening over time due to vibration. In the embodiment show, the outer circumference 48' of the pinion nut 40' includes three deformations 60 that are circumferentially spaced apart such that each deformation 60 extends into a different directional serration 54. The number of deformations 60 can be selected depending on the desired amount of retention for the pinion nut 40'. The deformations 60 are disposed in the plane P' established by the outer circumference 48' of the pinion nut 40' such that the deformations 60 are coplanar with the tool recesses 50'. The deformations 60 are spaced circumferentially apart from the tool recesses 50' such that the outer circumference 48' of the pinion nut 40' that is directly adjacent the tool recesses 50' is not deformed. Thus, the tool recesses 50' remain wholly intact to allow for engagement with a tool for rotating the pinion nut 40'.

In the second embodiment, the deformations 60 generally take the shape of the directional serrations 54. A first side 62 of the deformation 60 is sheared against the flat side 56 of the directional serration 54 which forms a positive stop preventing loosening of the pinion nut 40'. A second side 64 of the deformation 60 follows the curved side 58 of the directional serration 54 which reduces stress concentration in the outer circumference 48' of the pinion nut 40' as compared with the deformations 52 formed in the first embodiment.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A gearbox assembly comprising:
   a pinion gear including a gear stem defining an axis, said gear stem extending axially from a gear portion to an opposite distal end and having a threaded portion adjacent said distal end;
   an output member including an output flange and a tubular output stem, said output flange including a recessed portion defining an inner circumference coaxial with said tubular output stem, wherein said gear stem extends axially through said tubular output stem and said inner circumference such that said threaded portion protrudes from said output flange and said inner circumference includes a plurality of spaced apart serrations disposed therearound and extending radially outwardly into said output flange; and
   a pinion nut including a center hub having a threaded inner bore and an outer rim spaced outwardly from and circumscribing said center hub forming a gap therebetween, said threaded inner bore threadably engaging said threaded portion of said gear stem retaining said output member to said pinion gear, said outer rim defining an outer circumference including at least one tool recess and at least one deformation spaced circumferentially apart from said at least one tool recess, wherein said at least one tool recess is adapted for receiving a tool to rotate said pinion nut in a first direction relative to said gear stem, and said at least one deformation extending radially into at least one of said serrations and engaging said inner circumference of said output flange selectively locking said pinion nut to said output flange and preventing said pinion nut from rotating in a second direction relative to said gear stem.

2. The gearbox assembly as set forth in claim 1 wherein said outer rim establishes a plane perpendicularly to said axis, and wherein said plane intersects each of said tool recess and said deformation along said axis.

3. The gearbox assembly as set forth in claim 2 wherein said outer circumference of said pinion nut is undeformed between said at least one tool recess and said at least one deformation.

4. The gearbox assembly as set forth in claim 3 wherein said recessed portion is coaxial with said tubular output stem, and wherein said pinion nut abuts said recessed portion thereby retaining said output member to said pinion gear.

5. The gearbox assembly as set forth in claim 4 wherein said at least one deformation includes a plurality of deformations spaced circumferentially apart, each one of said plurality of deformations extending into a respective one of said plurality of serrations.

6. The gearbox assembly as set forth in claim 5 wherein said at least one tool recess includes a plurality of tool recesses spaced circumferentially apart, and wherein each one of said plurality of deformations is spaced circumferentially apart from said plurality of tool recesses.

7. The gearbox assembly as set forth in claim 1 wherein said at least one tool recess includes a first tool recess spaced circumferentially apart from a second tool recess, said at least one deformation spaced circumferentially between said first and second tool recesses.

8. The gearbox assembly as set forth in claim 1 wherein said inner circumference of said output member includes a plurality of directional serrations, said at least one deformation extending into one of said plurality of directional serrations.

9. The gearbox assembly as set forth in claim 8 wherein each one of said plurality of directional serrations includes a flat side and a curved side, said flat side extending radially outward relative to said inner circumference, and said curved side extending between said flat side of one of said plurality of directional serrations and said flat side of the adjacent one of said plurality of directional serrations.

10. The gearbox assembly as set forth in claim 9 wherein each one of said curved sides extends in a clockwise direction from an outer end of said flat side of one of said plurality of directional serrations to an inner end of said flat side of the adjacent one of said plurality of directional serrations.

11. The gearbox assembly as set forth in claim 10 wherein said at least one deformation is shaped substantially the same as one of said plurality of directional serrations, said at least one deformation includes a first side corresponding with said flat side and a second side corresponding with said curved side.

* * * * *